US012478996B2

(12) United States Patent
Jeltsch et al.

(10) Patent No.: US 12,478,996 B2
(45) Date of Patent: Nov. 25, 2025

(54) SPRAYING DEVICE AND PORTABLE POWER TOOL SYSTEM

(71) Applicant: J. WAGNER GmbH, Markdorf (DE)

(72) Inventors: Thomas Jeltsch, Friedrichshafen (DE); Jens Ulbrich, Friedrichshafen (DE); Steffen Schneider, Meckenbeuren (DE); Tino Ritter, Bermatingen (DE)

(73) Assignee: J. WAGNER GmbH, Markdorf (DE)

( * ) Notice: Subject to any disclaimer, the term of this patent is extended or adjusted under 35 U.S.C. 154(b) by 386 days.

(21) Appl. No.: 18/004,830

(22) PCT Filed: Jul. 9, 2021

(86) PCT No.: PCT/EP2021/069153
§ 371 (c)(1),
(2) Date: Jan. 9, 2023

(87) PCT Pub. No.: WO2022/008717
PCT Pub. Date: Jan. 13, 2022

(65) Prior Publication Data

US 2023/0302473 A1 Sep. 28, 2023

(30) Foreign Application Priority Data

Jul. 10, 2020 (DE) ..................... 10 2020 118 243.0

(51) Int. Cl.
*B05B 9/01* (2006.01)
*B05B 9/08* (2006.01)

(52) U.S. Cl.
CPC .............. *B05B 9/01* (2013.01); *B05B 9/0861* (2013.01)

(58) Field of Classification Search
CPC ................................ B05B 9/01; B05B 9/0861
(Continued)

(56) References Cited

U.S. PATENT DOCUMENTS

| | | | |
|---|---|---|---|
| 8,148,000 | B2 | 4/2012 | Furuta et al. |
| 10,615,733 | B2 | 4/2020 | Cox et al. |

(Continued)

FOREIGN PATENT DOCUMENTS

| | | | |
|---|---|---|---|
| CN | 105188953 | A | 12/2015 |
| CN | 105745028 | A | 7/2016 |

(Continued)

OTHER PUBLICATIONS

First Office Action for Chinese Patent Application No. 202180061991.2, dated May 29, 2024, 9 pages.

(Continued)

*Primary Examiner* — Christopher S Kim
(74) *Attorney, Agent, or Firm* — Christopher J. Volkmann; KELLY, HOLT & CHRISTENSON, PLLC

(57) ABSTRACT

A spraying device includes a tool body, a handle, and an energy store. The tool body is carried by way of the handle and one end of the handle, on the opposite side to the tool body, includes a coupling for mechanically and electrically coupling an energy store. A cage is connected to the coupling incorporated in a top of the cage. The cage includes two webs curved in a U shape arranged opposite one another and are each connected to the top of the cage. In a coupled state, the energy store is received in an interior space of the cage in such a way that the two webs each protrude downward beyond a housing of the coupled energy store and into the space. The energy store is assigned a lower opening, a left-hand opening, a right-hand opening, a front opening and a rear opening of the cage.

18 Claims, 3 Drawing Sheets

(58) Field of Classification Search
USPC .......................................................... 239/526
See application file for complete search history.

(56) References Cited

U.S. PATENT DOCUMENTS

| | | | |
|---|---|---|---|
| 2013/0020350 | A1 | 1/2013 | Gardos et al. |
| 2018/0126534 | A1 | 5/2018 | Iida et al. |
| 2018/0304454 | A1 | 10/2018 | Kawakami et al. |

FOREIGN PATENT DOCUMENTS

| | | | |
|---|---|---|---|
| CN | 208798582 | U | 4/2019 |
| DE | 102017130003 | A1 | 6/2019 |
| EP | 3093902 | A1 | 11/2016 |
| WO | WO 2014119130 | A1 | 8/2014 |
| WO | 2014182871 | A1 | 11/2014 |

OTHER PUBLICATIONS

International Search Report and Written Opinion for International Patent Application No. PCT/EP2021/069153, mailing date of Oct. 18, 2021, 15 pages with English Translation of the Search Report.
Search Report for German Patent Application No. 10 2020 118 243.0, dated Mar. 2, 2021, 8 pages.
International Preliminary Report on Patentability for International Patent Application No. PCT/EP2021/069153 dated Jan. 10, 2023, 7 pages.

SPRAYING DEVICE AND PORTABLE POWER TOOL SYSTEM

CROSS-REFERENCES TO RELATED APPLICATIONS

This application is a Section 371 National Stage Application of International Application No. PCT/EP2021/069153, filed Jul. 9, 2021, and published as WO 2022/008717A1 on Jan. 13, 2022, and claims priority to German Application No. 10 2020 118 243.0, filed Jul. 10, 2020, the contents of both are hereby incorporated by reference in their entirety.

DETAILED DESCRIPTION

Figure 1:
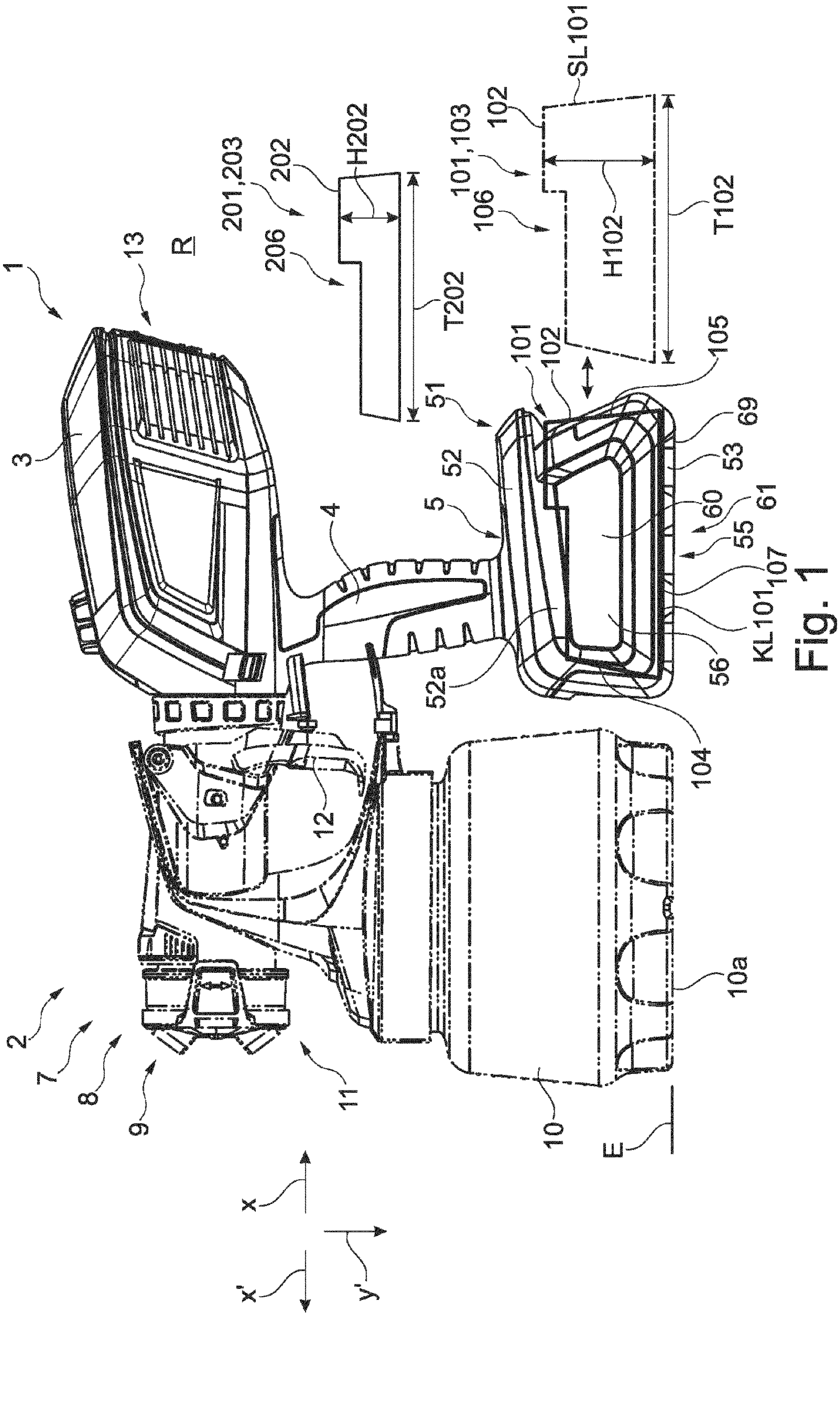
FIG. 1 shows a side view of a handheld power tool system according to one example, which comprises a spraying device.

The present disclosure generally relates to a spraying device, for example according to the preamble of claim 1 and to a handheld power tool system according to the preamble of claim 2.

The supply of energy to handheld spraying units by means of an energy store, which may be in the form of an electrical accumulator, is known from DE 10 2017 130 003 A1.

The present disclosure is based on the object of proposing a spraying device in the case of which the energy store is protected and at the same time undesirable overheating of the energy store is effectively avoided, and proposing a handheld power tool system in the case of which energy stores of different overall sizes are protected and at the same time undesirable overheating of the energy store is effectively avoided.

Proceeding from the features of the preamble of claims 1 and 2, respectively, this object is achieved by the characterizing features of claims 1 and 2, respectively. Advantageous and expedient refinements are specified in the dependent claims.

The spraying device according to one example comprises a tool body, a handle and an energy store, wherein the tool body is carried by way of the handle, wherein one end of the handle, on the opposite side to the tool body, comprises a coupling for mechanically and electrically coupling the energy store, wherein the spraying device comprises a cage, wherein the cage is connected to the coupling in such a way that the coupling is incorporated in a top of the cage, wherein the cage comprises two webs curved in a U shape, wherein the webs curved in a U shape are arranged opposite one another and are each connected to the top of the cage, wherein, in a coupled state, the energy store is received in an interior space of the cage in such a way that the U-shaped webs each protrude downward beyond a housing of the coupled energy store and into the space, and the energy store is assigned a lower opening, a left-hand opening, a right-hand opening, a front opening and a rear opening of the cage. These openings make it possible for heat generated in the energy store during operation of the spraying device to be discharged directly to the ambient air from five sides. This ensures reliable heat removal and prevents undesirable overheating.

The handheld power tool system according to one example comprises a spraying device, a first energy store and at least one second energy store, wherein the spraying device comprises a tool body and a handle, wherein the tool body is carried by way of the handle, wherein one end of the handle, on the opposite side to the tool body, comprises a coupling for mechanically and electrically coupling one of the energy stores, wherein the first energy store is in the form of a large energy store and has a first cuboidal housing with a maximum first width, a maximum first height and a maximum first depth, wherein the second energy store is in the form of a small energy store and has a second cuboidal housing with a maximum second width, a maximum second height and a maximum second depth, wherein the spraying device comprises a cage, wherein the cage is connected to the coupling in such a way that the coupling is incorporated in a top of the cage, wherein the cage comprises two webs curved in a U shape, wherein the webs curved in a U shape are arranged opposite one another and are each connected to the top of the cage, wherein, in a coupled state, one of the energy stores is received in the cage in such a way that the webs curved in a U shape each protrude downward beyond the housing of the respective coupled energy store and into the space, and the energy store is assigned a lower opening, a left-hand opening, a right-hand opening, a front opening and a rear opening of the cage, and wherein an interior space of the cuboidal cage is dimensioned such that it can receive each of the energy stores alternatively. These openings make it possible for heat generated in the respective energy store during operation of the handheld power tool system to be discharged directly to the ambient air from five sides irrespective of the overall size of the energy store. This ensures reliable heat removal and prevents undesirable overheating.

Furthermore, in the case of the spraying device or the handheld power tool system, it is provided that each of the webs curved in a U shape forms, together with a lateral piece of the top of the cage, a frame which is closed around the entire periphery and which forms the left-hand opening and the right-hand opening, wherein the web curved in a U shape and the lateral piece of the top in particular are formed in one piece. Such a design offers protection on multiple sides along with low material outlay, and can be produced easily by injection molding.

In the case of the spraying device or the handheld power tool system, it is also provided that a back piece of the top of the cage and a rear leg of the left-hand U-shaped curved web and a rear leg of the right-hand U-shaped curved web delimit a rear arch, which forms the rear opening of the cage. From an ergonomically advantageous perspective, this arch makes it possible to push the energy store into the interior space of the cage and pull it out of the interior space of the cage. In the process, the energy store makes mechanical and electrical contact with the coupling of the spraying device by means of the pushing-in movement. The mechanical contacting also comprises mechanical locking of the energy store to the coupling, with the result that said energy store is securely retained.

Furthermore, in the case of the spraying device or the handheld power tool system, it is provided that a back piece of the top of the cage and a front leg of the left-hand U-shaped curved web and a front leg of the right-hand U-shaped curved web delimit a front arch, which forms the front opening of the cage. Such a design makes it possible to avoid the formation of a transverse web, and therefore the energy store can be directly accessed by the ambient air even in a transition region in which a front end face of the energy store merges with a bottom face of the energy store.

In the case of the spraying device or the handheld power tool system, it is also provided that the coupling has a plate-like form. This makes it possible to easily incorporate the coupling in the top of the cage, and therefore, since said coupling forms part of the top, weight can be saved.

Furthermore, it is provided that the spraying device is in the form of a paint spraying device, which is preferably in the form of a HVLP paint spraying device or an airless paint spraying device. The energy stores intended for such spraying devices generate a lot of heat to be removed, on account of the high requirements for continuous power.

In the case of the spraying device or the handheld power tool system, it is also provided that the spraying device comprises a container for a fluid medium, a nozzle and a trigger, and in particular a fan. Such spraying devices place high demands on the energy store and require good cooling of the energy store.

Furthermore, in the case of the spraying device or the handheld power tool system, it is provided that the webs curved in a U shape are each in the form of a 2-component plastics element which comprises a tough and impact-resistant plastics part and a rubber-like plastics part, wherein the connection to the top of the cage is produced by the tough and impact-resistant plastics part and wherein a base region is formed by the rubber-like plastics part. This, for the one part, ensures optimum protection of the energy store e.g. when the spraying device falls down, and, for the other part, increases stability when the spraying device is set down.

In the case of the spraying device or the handheld power tool system, it is provided that the top of the cage, between the handle and the left-hand lateral piece and the right-hand lateral piece and the end piece and the back piece, comprises at least one through-opening leading into the interior space of the cage. This additionally still makes it possible to use the ambient air to cool a covering face of the energy store inserted in the spraying device and at the same time reduces the weight of the spraying device.

Furthermore, in the case of the spraying device or the handheld power tool system, it is provided that the energy store is in the form of an electrical energy store and in particular an accumulator. A form of this type means that a large range of standard accumulators is available.

In the case of the spraying device or the handheld power tool system, it is also provided that the height of the cage is dimensioned such that, when a container is mounted, a standing surface of the cage lies in a common plane with a bottom of the container. This makes it possible to significantly increase the stability of the spraying device, and in particular ensure said stability both when the container is full and when it is empty.

Lastly, in the case of the spraying device or the handheld power tool system, it is provided that, in a coupled state, the energy store or one of the energy stores is received in the interior space of the cage in such a way that the U-shaped webs each protrude forward and rearward beyond the housing of the coupled energy store and into the space. As a result, the energy store is protected even more comprehensively by the cage. Furthermore, this makes it possible to improve the stability of the spraying device.

Further details of examples of the present disclosure will be described in the drawing by means of schematically illustrated exemplary embodiments.

FIG. 1 shows a side view of a handheld power tool system 1 according to one example. The handheld power tool system 1 comprises a spraying device 2, partially illustrated only by dashed lines, a first energy store 101 and a second energy store 201. The spraying device 2 comprises a tool body 3 and a handle 4. In this respect, the tool body 3 is carried by way of the handle 4 and in this respect the handle 4 comprises a coupling 5 for mechanically and electrically coupling one of the two energy stores 101, 201, wherein the coupling 5 is situated opposite the tool body 3 at one end. The first energy store 101 is in the form of a large energy store and has a first cuboidal housing 102 with a maximum first width B102 (see FIG. 4), a maximum first height H102 and a maximum first depth T102. The second energy store 201 is in the form of a small energy store and has a second cuboidal housing 202 with a maximum second width B202, a maximum second height $H_2O_2$ and a maximum second depth T202. The spraying device 2 furthermore comprises a cage 51. The cage 51 is connected to the coupling 5 in such a way that the coupling 5 is incorporated in a top 52 of the cage 51. The cage 51 comprises two webs 53, 54 curved in a U shape, wherein the webs 53, 54 curved in a U shape are arranged opposite one another and are each connected to the top 52 of the cage 51. In the illustration of FIG. 1, the first energy store 101 is shown in a state coupled to the coupling 5 and in this respect is received in the cage 51 in such a way that the webs 52, 53 curved in a U shape each protrude forward—in the direction of the arrow x' rearward—in the direction of the arrow x—and downward—in the direction of the arrow y'—beyond the housing 102 of the first energy store 101 and into the space R surrounding the spraying device 2 and the first energy store 101. Consequently, the first energy store 101 in the coupled state is assigned a lower opening 55, a left-hand opening 56, a right-hand opening 57, a front opening 58 and a rear opening 59 of the cage 51. An interior space 60 of the cuboidal cage 51 is dimensioned such that it can selectively receive each of the two energy stores 101, 201 alternatively.

Figure 2:
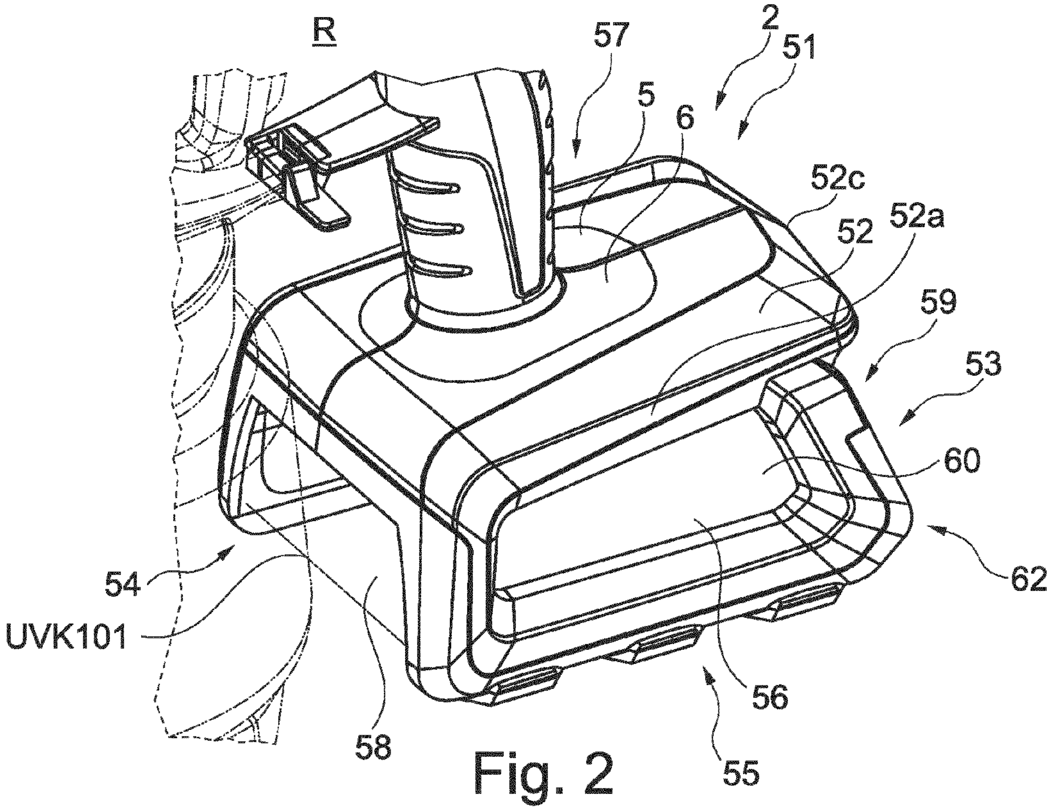
FIG. 2 shows a perspective view of a detail of the spraying device known from FIG. 1 in the region of the cage.
Figure 3:
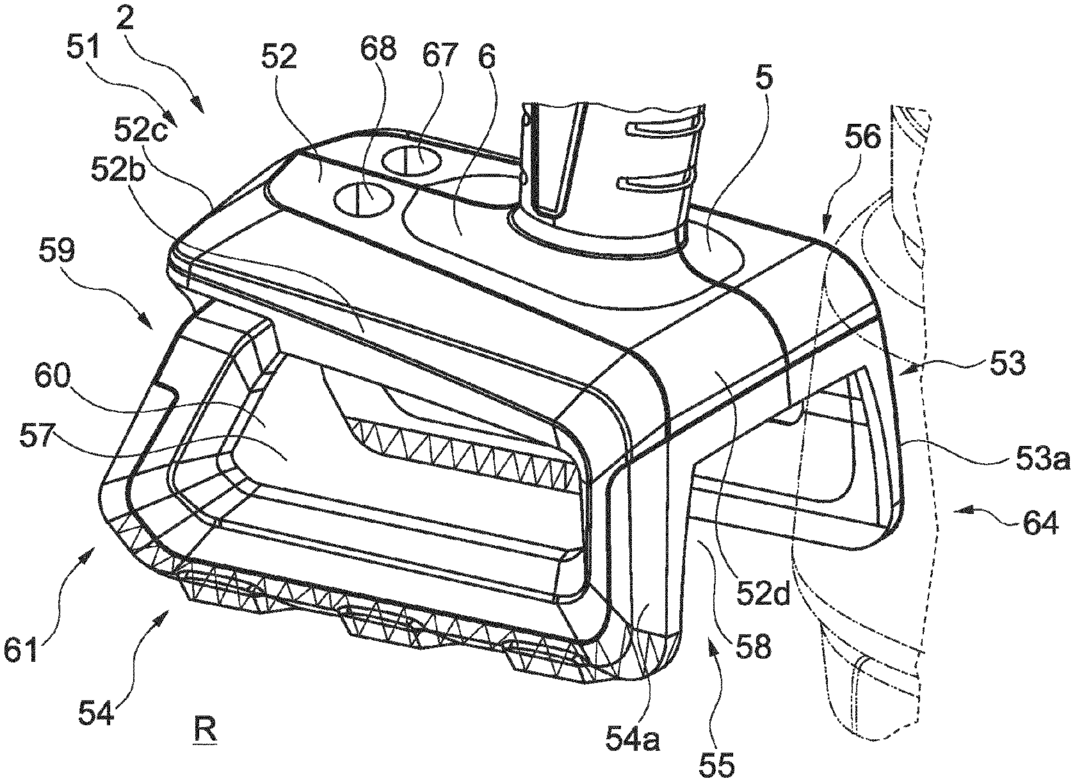
FIG. 3 shows a view of the illustration of FIG. 2 that is rotated about a vertical axis by approximately 180°.

The perspective views of FIGS. 2 and 3 show perspective views of a detail of the spraying device 2 shown in FIG. 1 in the region of the cage 51, wherein no part of the energy stores is shown in the interior space 60 of the cage 51 and, in FIG. 2, only one edge of the energy store 101 is indicated by a dash-dotted line.

Figure 4:
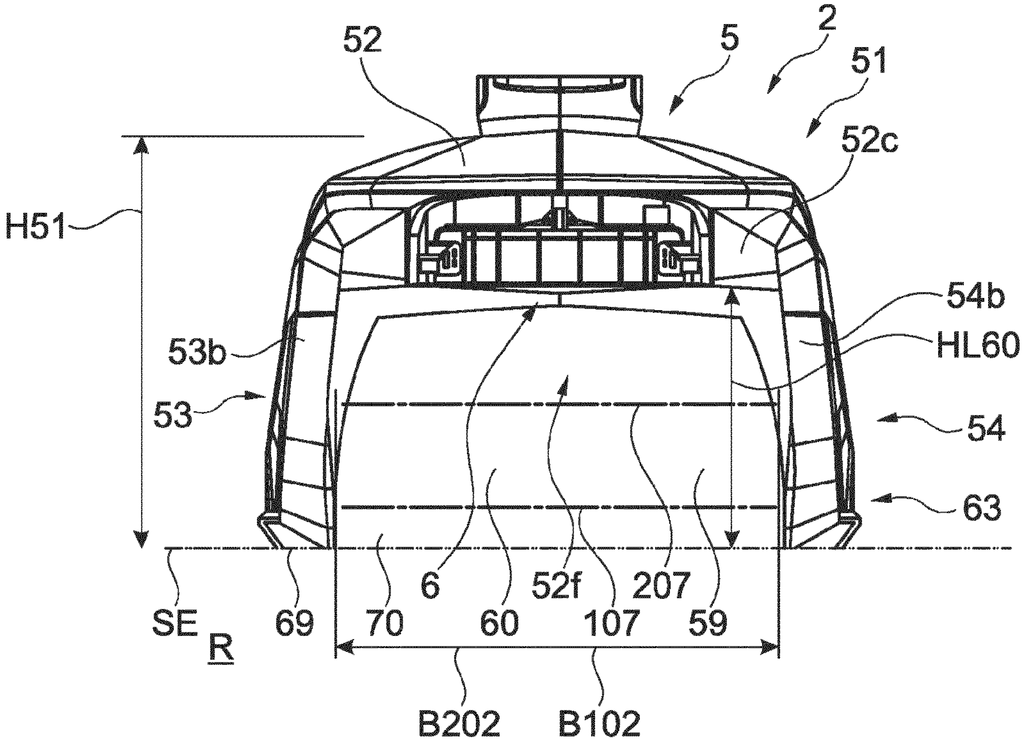
FIG. 4 shows a side view, from the right, of the spraying device shown in FIG. 1 in the region of the cage.

FIG. 4 shows a side view of the spraying device 2 shown in FIG. 1, wherein said side view is illustrated only in the region of the cage 51. In this view, both energy stores 101, 201 are indicated by dash-dotted lines.

FIG. 1 schematically shows the first energy store 101 in the form of an accumulator 103 twice.

The first energy store 101 for the one part is shown schematically in a position pushed into the interior space 60 of the cage 51 by a thick contour line KL101. In this respect, this thick contour line KL101 is to be understood only as a schematic illustration of the position of the first energy store 101. The first energy store 101 is arranged in this position between the left-hand U-shaped web 53 and the right-hand U-shaped web 54 under the top 52 (cf. in this respect in particular also FIGS. 2 and 3). The first energy store 101 for the other part is illustrated, also schematically, in a second position outside the cage 51 by a dashed line SL101. This indicates its ability to be pulled out of the interior space 60 of the cage 51.

The second energy store 201 is furthermore shown schematically in FIG. 1 for the purpose of the alternative use. Said second energy store is likewise in the form of an accumulator 203 and can be pushed into the interior space 60 of the cage 51 instead of the first energy store 101, shown by the thick contour line KL101.

It is clear from jointly considering FIGS. 1 to 3 that each of the webs 53, 54 curved in a U shape, together with a side piece 52*a* and 52*b*, respectively, of the top 52 of the cage 51, forms a left-hand frame 61 and a right-hand frame 62, respectively, the frames being closed around the entire periphery. In this respect, the left-hand opening 56 is formed by the left-hand frame 61 and in this respect the right-hand opening 57 is formed by the right-hand frame 62. Here, the webs 53 and 54 curved in a U shape are formed in one piece with the side pieces 52*a* and 52*b*, respectively, of the top 52.

A back piece 52*c* of the top 52 of the cage 51 and a rear leg 53*b* of the left-hand U-shaped curved web 53 and a rear leg 54*b* of the right-hand U-shaped curved web 54 form a rear arch 63, which forms the rear opening 59 of the cage 51 (see in particular FIG. 4). From an ergonomically advantageous perspective, this arch 63 makes it possible to pull e.g. the first energy store 101, illustrated by the contour line KL101 in FIG. 1, out of the interior space 60 of the cage 51 in the direction of the arrow x. During the pulling out operation, an existing mechanical and electrical contact between the first energy store 101 and the coupling 5 is canceled, wherein a locking means, not illustrated, via which the first energy store 101 is connected to the coupling 5 and/or the top 52, is released beforehand. This locking means is released preferably in a conventional way by means of an unlocking button, not illustrated, which is arranged on a rear end face 105 of the first energy store 101 and is actuated preferably by the thumb. When the first energy store 101 is being pulled out, the rest of the fingers rest against a front end face 104 of the first energy store 101 in the region of the front opening 58, wherein the palm of the hand is opposite a bottom face 107 of the first energy store 101 in the process (see in particular FIG. 1). The pushing in of one of the energy stores 101, 201 is effected in reverse order, wherein for that purpose the energy store 101, 201 is always guided along with a top face 106 or 206 on a lower side 52*f* (see FIG. 4) of the top 52, in order to ensure mechanical and electrical contact is made with the coupling 5.

A back piece 52*d* (see FIG. 3) of the top 52 of the cage 51 and a front leg 53*a* of the left-hand U-shaped curved web 53 and a front leg 54*a* of the right-hand U-shaped curved web 54 form a front arch 64, which forms the front opening 58 of the cage 51. The front opening 58 and the lower opening 55 correspondingly merge with one another without forming a transverse web. Consequently, the first energy store 101 can be cooled unimpeded even in a transition region, in which its front end face 104 merges with its bottom face 107, by the ambient air located in the space R. For illustrative purposes, in FIG. 2 a dash-dotted line is used to indicate a lower front edge UVK101 of the first energy store 101, at which lower front edge its front end face 104 merges with its bottom surface 107 (see FIGS. 1 and 2).

The coupling 5 of the spraying device 2 has a plate-like form in the form of a coupling plate 6, which is incorporated centrally in the top 52 of the cage 51 in such a way that the top 52 runs around the entire periphery of the coupling plate 6 (see in particular FIGS. 2 to 4).

As can be seen in FIGS. 1 to 3, the spraying device 2 is in the form of a spraying device 7. Very specifically, the spraying device 2 is in the form of a paint spraying device 8 of the HVLP paint spraying device 9 type, which comprises a container 10 for a fluid medium, not illustrated, a nozzle 11 and a trigger 12, and in particular a fan 13 incorporated in the tool body 3. The fan 13 comprises an electric motor which creates an air flow, used to atomize paint from the container 10, by means of its fan impeller or some other technique.

According to an embodiment variant included by way of example in the illustration of FIG. 3, it is also provided that the top 52 of the cage 51 comprises two through-openings 67, 68, which lead into the interior space 60 of the cage 51, between the handle 4 and the back piece 52*c* for the purpose of additional cooling of the energy store.

The height H51 of the cage 51 is dimensioned such that, when a container 10 is mounted, a standing surface 69 of the cage 51 lies in a common plane E with a bottom 10*a* of the container (see FIGS. 1 and 4).

Furthermore, a clear height HL60 (see FIG. 4 considered jointly with FIG. 1) of the interior space 60 of the cage 51 is dimensioned such that the interior space 60 can receive both a small energy store 201, the housing 202 of which has a maximum height H202, and a large energy store 101, the housing 102 of which has a maximum height H102, in such a way that a ventilation duct 70 sufficient for heat to be removed by way of the ambient air in the space R exists between a standing plane SE defined by the standing surface 69 and a bottom face 107 and 207, respectively, of the housing 102, 202 of the energy store 101 and 201, respectively. This makes it possible also to cool the energy store 101 and 201 on its bottom face 107 and 207, respectively, by way of the ambient air in the space R, when the spraying device 2 is set down on a table or the like when operation ends.

For all embodiment variants of the spraying device and of the handheld power tool system, it holds true that the cage, in terms of its structure, is in the form of a carriage, in the case of which the left-hand connecting leg forms a left-hand base and the right-hand connecting leg forms a right-hand base, and in which the top of the cage forms a transport face of the carriage, on which transport face the handle is mounted or with which transport face the handle is formed in one piece. The energy store respectively in use for the purpose of supplying energy is received between the bases and the transport surface, wherein energy stores of different overall sizes can be used.

For all embodiment variants, it also holds true that the webs curved in a U shape can also comprise additional struts, e.g. for the purpose of further stiffening, with the result that the left-hand opening and/or the right-hand opening are subdivided.

A further embodiment variant provides that the left-hand web curved in a U shape and the right-hand web curved in a U shape are each connected to the top of the cage only by way of the front leg or only by way of the rear leg, wherein it is provided in particular that, in each case, only the front leg is connected to the top of the cage and each rear leg ends in the space in a free manner.

Although the present invention has been described with reference to preferred embodiments, workers skilled in the art will recognize that changes may be made in form and detail without departing from the spirit and scope of the invention.

LIST OF REFERENCE SIGNS

1 Handheld power tool system
2 Spraying device
3 Tool body
4 Handle
5 Coupling
6 Coupling plate

7 Spraying device
8 Paint spraying device
9 HVLP paint spraying device
10 Container
10*a* Bottom of 10
11 Nozzle
12 Trigger
13 Fan
E Common plane of 10*a* and 69
R Space
SE Standing plane
51 Cage
52 Top of 51
52*a* Left-hand lateral piece of 52
52*b* Right-hand lateral piece of 52
52*c* Back piece of 52
52*d* End piece of 52
52*f* Underside of 52
53 Left-hand web curved in a U shape
53*a* Front leg of 53
53*b* Rear leg of 53
53*c* Connecting leg
54 Right-hand web curved in a U shape
54*a* Front leg of 54
54*b* Rear leg of 54
54*c* Connecting leg
55 Lower opening
56 Left-hand opening
57 Right-hand opening
58 Front opening
59 Rear opening
60 Interior space of 51
61 Left-hand frame
62 Right-hand frame
63 Rear arch
64 Front arch
65 Base region of 53
66 Base region of 54
67, 68 Through-opening of 52
69 Standing surface of 51
70 Ventilation duct
H51 Height of 51
HL60 Clear height of 60
K53-1 Tough, impact-resistant plastics part of 53
K53-2 Rubber-like plastics part of 53
K54-1 Tough, impact-resistant plastics part of 54
K54-2 Rubber-like plastics part of 54
101 First energy store
102 Housing
103 Accumulator
104 Front end face
105 Rear end face
106 Top face
107 Bottom face
B102 Maximum width of 102
H102 Maximum height of 102
T102 Maximum depth of 102
UVK101 Lower front edge of 101
KL101 Contour line
SL101 Dash-dotted line
201 Second energy store
202 Housing
203 Accumulator
206 Top face
207 Bottom face
B202 Maximum width of 202
$H_2O_2$ Maximum height of 202
T202 Maximum depth of 202
x, x', y' Spatial direction

The invention claimed is:

1. A spraying device comprising
a tool body,
a handle, and
an energy store,
wherein the tool body is carried by way of the handle and
wherein one end of the handle, on an opposite side to the tool body, comprises a coupling for mechanically and electrically coupling the energy store,
wherein the spraying device comprises a cage,
wherein the cage is connected to the coupling in such a way that the coupling is incorporated in a top of the cage,
wherein the cage comprises two webs curved in a U shape,
wherein the two webs curved in the U shape are arranged opposite one another and are each connected to the top of the cage,
wherein, in a coupled state, the energy store is received in an interior space of the cage in such a way that the two webs each protrude downward beyond a housing of the coupled energy store and into the space, and a lower opening, a left-hand opening, a right-hand opening, a front opening and a rear opening of the cage is allocated to the energy store.

2. The spraying device as claimed in claim 1, wherein each web, of the two webs curved in the U shape, forms, together with a lateral piece of the top of the cage, a frame which is closed around an entire periphery and which forms the left-hand opening and the right-hand opening, respectively.

3. The spraying device as claimed in claim 1, wherein a back piece of the top of the cage and a rear leg of at least one web of the two webs and a rear leg of at least one web of the two webs delimit a rear arch, which forms the rear opening of the cage.

4. The spraying device as claimed in claim 3, wherein an end piece of the top of the cage and a front leg of at least one web of the two webs and a front leg of at least one web of the two webs delimit a front arch, which forms the front opening of the cage.

5. The spraying device as claimed in claim 4, wherein the top of the cage, between the handle and a left-hand lateral piece and a right-hand lateral piece and the end piece and the back piece, comprises at least one through-opening leading into the interior space of the cage.

6. The spraying device as claimed in claim 1, wherein the spraying device is in the form of a HVLP paint spraying device or an airless paint spraying device.

7. The spraying device as claimed in claim 1, wherein the spraying device comprises a container for a fluid medium, a nozzle and a trigger.

8. The spraying device as claimed in claim 7, wherein a height of the cage is dimensioned such that, when a container is mounted, a standing surface of the cage lies in a common plane with a bottom of the container.

9. The spraying device as claimed in claim 1, wherein the two webs curved in the U shape are each in the form of a 2-component plastics element which comprises a tough and impact-resistant plastics part and plastics part, wherein a connection to the top of the cage is produced by the tough and impact-resistant plastics part and wherein a base region is formed by the plastics part.

10. The spraying device as claimed in claim 1, wherein the energy store is in the form of an electrical energy store.

11. The spraying device as claimed in claim 1, wherein, in a coupled state, the energy store or one of the energy stores is received in the interior space of the cage in such a way that each web of the two webs each protrude forward and rearward, respectively, beyond the housing of the coupled energy store and into the space.

12. A handheld power tool system comprising a spraying device, a first energy store and a second energy store, wherein the first energy store is larger than the second energy store, wherein the spraying device comprises a tool body and a handle, wherein the tool body is carried by way of the handle, wherein one end of the handle, on an opposite side to the tool body, comprises a coupling for mechanically and electrically coupling one of the energy stores, wherein the first energy store has a first cuboidal housing with a first width, a first height and a first depth and wherein the second energy store has a second cuboidal housing with a second width, a second height and a second depth, wherein the spraying device comprises a cage, wherein the cage is connected to the coupling in such a way that the coupling is incorporated in a top of the cage, wherein the cage comprises two webs curved in a U shape, wherein the two webs curved in the U shape are arranged opposite one another and are each connected to the top of the cage, wherein, in a coupled state, a respective energy store, of the first energy store or the second energy store, is received in the cage in such a way that the two webs curved in the U shape each protrude downward beyond the respective cuboidal housing of the respective energy store and into a space, and a lower opening, a left-hand opening, a right-hand opening, a front opening and a rear opening of the cage is allocated to the respective energy store, wherein an interior space of the cage is dimensioned such that the interior space can receive each of the first energy store or the second energy store alternatively.

13. The handheld power tool system of claim 12, wherein each web, of the two webs curved in the U shape, forms, together with a lateral piece of the top of the cage, a frame which is closed around an entire periphery and which forms the left-hand opening and the right-hand opening, respectively.

14. The handheld power tool system of claim 12, wherein a back piece of the top of the cage and a rear leg of at least one web of the two webs and a rear leg of at least one web of the two webs delimit a rear arch, which forms the rear opening of the cage.

15. The handheld power tool system of claim 14, wherein an end piece of the top of the cage and a front leg of at least one web of the two webs and a front leg of at least one web of the two webs delimit a front arch, which forms the front opening of the cage.

16. The handheld power tool system of claim 15, wherein the top of the cage, between the handle and a left-hand lateral piece and a right-hand lateral piece and the end piece and the back piece, comprises at least one through-opening leading into the interior space of the cage.

17. The handheld power tool system of claim 12, wherein the two webs curved in the U shape are each in the form of a 2-component plastics element which comprises a tough and impact-resistant plastics part and a-rubber like plastics part, wherein a connection to the top of the cage is produced by the tough and impact-resistant plastics part and wherein a base region is formed by the plastics part.

18. The handheld power tool system of claim 12, wherein the energy store is in the form of an electrical energy store.

* * * * *